(12) United States Patent
De Schutter

(10) Patent No.: US 11,422,116 B2
(45) Date of Patent: Aug. 23, 2022

(54) ROBOT SYSTEM AND METHOD FOR NON-DESTRUCTIVE TESTING

(71) Applicant: FLEXIBLE ROBOTIC SOLUTIONS, Sint-Niklaas (BE)

(72) Inventor: Joris De Schutter, Boom (BE)

(73) Assignee: FLEXIBLE ROBOTIC SOLUTIONS, Sint-Niklaas (BE)

( * ) Notice: Subject to any disclaimer, the term of this patent is extended or adjusted under 35 U.S.C. 154(b) by 125 days.

(21) Appl. No.: 17/048,043

(22) PCT Filed: Apr. 16, 2019

(86) PCT No.: PCT/EP2019/059812
§ 371 (c)(1),
(2) Date: Oct. 15, 2020

(87) PCT Pub. No.: WO2019/201925
PCT Pub. Date: Oct. 24, 2019

(65) Prior Publication Data
US 2021/0148866 A1    May 20, 2021

(30) Foreign Application Priority Data
Apr. 16, 2018   (BE) .............................. BE2018/5255

(51) Int. Cl.
*G01N 29/04*   (2006.01)
*G01N 29/265*   (2006.01)
*G01N 29/22*   (2006.01)

(52) U.S. Cl.
CPC ........... *G01N 29/225* (2013.01); *G01N 29/04* (2013.01); *G01N 29/265* (2013.01);
(Continued)

(58) Field of Classification Search
CPC .... G01N 29/225; G01N 29/04; G01N 29/265; G01N 2291/023; G01N 2291/106; G01N 2291/2638
(Continued)

(56) References Cited

U.S. PATENT DOCUMENTS 3,898,838 A    8/1975   Connelly
4,881,177 A    11/1989  McClean et al.
(Continued)

FOREIGN PATENT DOCUMENTS

DE        10259653 B3      4/2004
DE    102013110667 A1      3/2015
(Continued)

OTHER PUBLICATIONS

2017 IEEE International Conference on Robotics and Automation (ICRA) Singapore, May 29-Jun. 3, 2017, Autonomous Robotic System using Non-Destructive Evaluation methods for Bridge Deck Inspection, Tuan et al. (Year: 2017).*
(Continued)

*Primary Examiner* — Jacques M Saint Surin
(74) *Attorney, Agent, or Firm* — Christensen O'Connor Johnson Kindness PLLC

(57) ABSTRACT

A robot system for non-destructive testing (NDT) of a test object, including: a transducer holder and an NDT transducer to perform an NDT on the surface of the test object; a memory to store a predefined trajectory of the NDT transducer; a force-sensing device to provide measurements of the contact forces and/or contact moments between the surface of the test object and the NDT transducer and/or the transducer holder; a controller to generate an actuation signal based on the predefined trajectory; and a positioning device to control the position and/or orientation of the NDT transducer relative to the test object based on the actuation
(Continued)

signal. Consequently, the position and/or orientation of the NDT transducer relative to the test object and the contact forces and/or contact moments between the NDT transducer and/or the transducer holder and the test object can be automatically adapted to improve the quality of the NDT measurement.

19 Claims, 2 Drawing Sheets

(52) U.S. Cl.
CPC . *G01N 2291/023* (2013.01); *G01N 2291/106* (2013.01); *G01N 2291/2638* (2013.01)

(58) Field of Classification Search
USPC .......................................................... 73/634
See application file for complete search history.

(56) References Cited

U.S. PATENT DOCUMENTS

| | | | | |
|---|---|---|---|---|
| 6,378,387 | B1* | 4/2002 | Froom ................ | G01M 5/0075 73/865.8 |
| 6,907,799 | B2* | 6/2005 | Jacobsen ................... | B64F 5/30 901/44 |
| 7,784,348 | B2* | 8/2010 | Dubois ................ | G10K 15/046 73/620 |
| 8,713,998 | B2* | 5/2014 | Troy .................. | G01N 29/4481 73/104 |
| 9,234,904 | B2* | 1/2016 | Troy ...................... | G01N 29/00 |
| 9,594,059 | B1 | 3/2017 | Brady et al. | |
| 2011/0000299 | A1 | 1/2011 | Isobe et al. | |
| 2017/0284973 | A1 | 10/2017 | Falter et al. | |

FOREIGN PATENT DOCUMENTS

| | | | |
|---|---|---|---|
| JP | H02302663 A | 12/1990 | |
| WO | WO 2019201925 A1 * | 10/2019 | ............. G01N 29/04 |

OTHER PUBLICATIONS

International Search Report dated Jun. 19, 2019, issued in corresponding International Application No. PCT/EP2019/059812, filed Apr. 16, 2019, 3 pages.
Written Opinion of the International Searching Authority dated Jun. 19, 2019, issued in corresponding International Application No. PCT/EP2019/059812, filed Apr. 16, 2019, 7 pages.
Written Opinion of the International Preliminary Searching Authority dated Feb. 5, 2020, issued in corresponding International Application No. PCT/EP2019/059812, filed Apr. 16, 2019, 1 page.
International Preliminary Report on Patentability dated Jun. 17, 2020, issued in corresponding International Application No. PCT/EP2019/059812, filed Apr. 16, 2019, 31pages.
Demey, S., et al., "Model-Based Planar Contour Following in the Presence of Pose and Model Errors," International Journal of Robotics Research, 16(6):840-858, Dec. 1, 1997.

* cited by examiner

ROBOT SYSTEM AND METHOD FOR NON-DESTRUCTIVE TESTING

TECHNICAL FIELD

Embodiments of the present disclosure relate to a robot system for non-destructive testing (NDT) of a test object and to a method for NDT of a test object using the robot system.

BACKGROUND

NDT is a wide group of analysis techniques used in industry to evaluate the properties of a material, component or system without causing damage.

Ultrasonic testing (UT) is one of the most widely used techniques for NDT. UT is based on the propagation of ultrasonic waves in the object or material to be tested and can be used for detecting inhomogeneities of density or elasticity, such as cavities or material flaws. For example, UT may be used in verifying the quality of sheet metal stamping and assembly operations. In particular, certain vehicle door types consist of metal sheet inner and outer parts which are glued, plied and welded along the door edges and UT is performed to verify correct glue bonding.

In UT, an ultrasound transducer connected to a diagnostic or measurement processing system is passed over the object being inspected. The transducer is typically separated from the test object by a couplant (such as oil) or by water, as in immersion testing.

Manual UT with a portable diagnostic system and a hand-held transducer is usually the simplest and least expensive technique to implement. In manual UT an operator typically monitors a waveform on a graphical display connected to the display or measurement processing system while moving the transducer along the surface of a test object. Manual UT requires careful attention by an experienced operator. It is therefore strenuous and slow, in particular when a dense or full coverage of the object to be inspected is required. It is also known that test objects which are rough, irregular in shape, very small or thin, or not homogeneous, are difficult to inspect.

Phased array (PA) ultrasonics is an advanced method of UT in which a large volume of material can be tested by focusing and sweeping the beam from a PA probe electronically without moving the probe. The beam is controllable because a PA probe is made up of multiple small transducers, each of which can be pulsed individually. While PA-UT is therefore capable of speeding up the inspection process, PA probes are typically larger than monolithic probes which contain only one transducer, and hence they may not be appropriate to use in some applications with space constraints.

Since manual testing is typically not practical for 100% inspection of test objects because of the time required for inspection and documentation of the test results, automated NDT, in particular automated UT, solutions have been developed. Automated UT typically uses one or more transducers with water squirters, water-filled coupling boxes, or a water bath to maintain acoustic coupling. Typically, the one or more transducers and/or the test object are attached to the end effector of one or more positioning devices, such as robots, to generate relative motion between the one or more transducers and the test object.

Automated UT solutions with water squirters or where the test object is immersed in water have the advantage that no contact between the transducer and the test object is required. These solutions however are not always practical or cost efficient.

An example of contactless UT is disclosed in US 2011/000299 A1 where an ultrasonic transducer is used for flaw detection in an object. Furthermore, in this example, the ultrasonic transducer is used for calculation of the distance and tilt of the ultrasonic transducer with respect to the object.

U.S. Pat. No. 3,898,838 A discloses a robot system. The system relies on contactless measurement using a liquid coupling medium. The system includes a transducer placed in a search tube, the search tube has a controllable position. The optimal position requires a normal orientation of the transducer with respect to the surface and a uniform spacing.

Other automated UT solutions still require contact between the transducer and the test object. In such solutions, maintaining suitable contact to guarantee a high-quality UT measurement while moving the transducer along the test object typically requires some method of controlling the contact forces and/or contact moments between the transducer and the test object. Such method could be passive, for example using springs, or active, for example by using hybrid position/force control of a robot arm, a technique known in robotics, in which the contact forces and/or moments are measured and fed back to the robot control system, or a combination of both.

In addition, known techniques in robotics allow to use the measured contact forces and/or moments in automatic surface or edge tracking controllers which, at least partly, generate the required relative motion between transducer and test object on-line while following the surface or edge. For example, see JP H02 302663 A, which generally relates to NDT of an object having a 3D shape.

However, even with passive or active control of the contact forces and/or contact moments between transducer and test object it is not always possible to maintain suitable contact to guarantee a high-quality UT measurement while moving the transducer along the test object, in particular in case parts of the test object are rough, irregular in shape, very small or thin, or not homogeneous.

SUMMARY

It is an aim of the present disclosure to provide a robot system for non-destructive testing (NDT) of a test object solving one or more of the disadvantages in the state of the art.

This aim is achieved according to the disclosure in that the NDT transducer is configured to make contact with the surface of the test object, in that the robot system further comprises a force-sensing device configured to provide measurements of contact forces and/or contact moments between the surface of the test object and the NDT transducer in that the controller further comprises a force-sensing module configured to process measurements of the force-sensing device to generate a force feedback signal, in that the signal generation module is configured to generate the actuation signal based on the predefined trajectory, the NDT feedback signal and the force feedback signal, and in that the controlled multi degree of freedom positioning device is configured to control the position and/or orientation of the NDT transducer relative to the test object together with contact forces and/or contact moments between the test object and the NDT transducer.

Consequently, the robot system combines feedback of both contact force/moment measurements and NDT measurements to provide, at the same time, adequate contact pressure distribution between the surface of the test object and at least one of the surface of the NDT transducer and the surface of the transducer holder, as specified by the desired contact forces and/or moments and optimal position and/or orientation of the NDT transducer relative to the surface of the test object to provide optimal NDT measurement quality.

Possible and/or optimal combinations of force/moment feedback and NDT feedback depend on the particular contact configuration between the surface of the test object, the NDT transducer and the transducer holder.

For example, if the contact area between NDT transducer and test object is wider in one direction and narrower in the other direction, the out-of-plane contact moments will typically have a larger magnitude in one direction and will be smaller in the other direction. If contact moments are large enough to be measured with sufficient accuracy by the force sensing device, feedback of the measured moment can be used to position the NDT transducer relative to the surface of the test object in the corresponding rotational direction. If, however, contact moments are too small to be measured with sufficient accuracy, then feedback of the measured moment cannot be used and it is advisable to orient the NDT transducer relative to the surface of the test object using feedback of the NDT transducer. In some other cases it could be advantageous to combine both force feedback and NDT feedback in the same direction.

In some applications the NDT transducer is held by a transducer holder which is connected to the end effector of the positioning device and which—in addition to the NDT transducer—also makes contact with the surface of the test object by means of a guiding system, for example guiding wheels, which guides the holder, hence also the transducer, in their motion over the surface of the test object. A notable example is a holder configured to guide an NDT transducer along the edge of an object to be tested. In such applications, besides contact forces/moments between NDT transducer and test surface, there are also contact forces/moments between holder and test surface that can be used to control the position and orientation of the holder, hence also of the NDT transducer, with respect to the edge of the test surface.

Through the use of these feedback signals, the robot system is capable of providing a high-quality NDT measurement in the presence of: deviations between the CAD model or point cloud model which was used to generate the predefined trajectory and the actual test object geometry; misalignment between the modelled position and/or orientation of the test object and its actual position and/or orientation; deviations between the predefined trajectory of the end effector and the real, executed trajectory; and/or local surface irregularities of the test object in terms of geometry or roughness. Moreover, this high-quality NDT measurement may be obtained without the need of a squirter or immersion of the test object in water.

In an embodiment of the present disclosure the force-sensing device of the robot system comprises a force transducer and/or a torque transducer mounted on or within the end effector. Alternatively, the force-sensing capability of the robot system may be provided by one or more torque transducers integrated in the positioning device, e.g. within one or more joints of a robot arm acting as the positioning device. Furthermore, the force-sensing capability of the robot system may also be provided by current measurement in one or more of the electric joint actuators of the robot arm. It will be appreciated that other means for force sensing are also possible.

In an embodiment of the present disclosure the controller is further configured to modify the predefined trajectory based on the measurements of the force-sensing device and/or of the NDT measurements, the memory being further configured to store the modified trajectory. Furthermore, the predefined trajectory may also be modified according to the statistics of the adapted position and/or orientation of the NDT transducer resulting from multiple NDT sequences carried out on the same test object or on multiple test objects of similar shape.

This is particularly useful in situations where multiple similar test objects or parts thereof need to be tested as the robot system will start from an improved predefined trajectory for the subsequent NDT.

Furthermore, the predefined and/or modified trajectories for the positioning device may be stored in the memory in a way that represents the local shape of the test object without any reference to a fixed coordinate system. In a preferred embodiment this local shape is represented by means of local curvature information as known from differential geometry. Consequently, these trajectories are independent of any inaccuracy in positioning and/or orienting the test object. In other words, in case the test object is not correctly positioned and/or oriented, the robot system, with its feedback based on measured contact forces/moments and based on the NDT measurement, will still be able to follow the surface of the test object accurately and perform the NDT test adequately. Consequently, accurate, and typically expensive, test object positioning systems are not required.

In an embodiment of the present disclosure the controller further comprises a trajectory generation module configured to generate at least a part of the predefined trajectory by using an automatic surface tracking algorithm or an automatic edge tracking algorithm based on the measurements of the force-sensing device.

In this embodiment the predefined trajectory is not generated based on a detailed geometric model, such as a CAD model or a point cloud model of the test object, but is generated using an automatic surface and/or edge tracking control algorithm which uses the measured contact forces and/or moments between the NDT transducer and the surface of the test object. Such a tracking control algorithm is typically used during a learning or programming phase. The surface may or may not be doubly curved, i.e. curved in one or two directions. Consequently, should a detailed geometric model not be available, or, if available, should not be used, to generate a robot trajectory, the robot system is still able to perform the NDT. Moreover, this may allow a more intuitive programming of the robot trajectory.

In an embodiment, the trajectory generation module is further configured to determine the local shape of the test object based on the measurements of the force-sensing device, the controller being further configured to determine the position of the NDT sensor relative to the test object by comparing the measured local shape of the test object with the local shape represented in the predefined or learned trajectory.

This embodiment has the advantage that, when the test object is not accurately positioned, or when positioning errors occur in the robot system, the system can take into account the actual position of the NDT transducer relative to the test object. In this way, the inaccurate positioning may be automatically compensated, which leads to a better quality of surface or edge tracking and consequently to a better quality of the NDT-measurement. At the same time, the speed at which the measurement is performed can also be increased. A trajectory generation module configured to determine the local shape of the test object based on the measurements of the force-sensing device is described in Demey S., Bruyninckx H., De Schutter J. (1997), "*Model-based planar contour following in the presence of pose and model errors*", International Journal of Robotics Research, 16 (6), 840-858. doi: 10.1177/027836499701600608.

In an alternative embodiment of the present disclosure the predefined trajectory is based on a geometric model of the test object, in particular a CAD model or a point cloud model.

This avoids the need for performing the learning or programming phase to generate the predefined trajectory.

Furthermore, in another embodiment of the present disclosure, the geometric model of the test object may be combined with the automatic surface tracking and/or edge tracking control algorithm. In this embodiment, the surface tracking and/or edge tracking control algorithm incorporates the available geometric model as initial information. Consequently, the trajectory can be generated faster and more accurately during automatic tracking by using an initial approximate geometric model of the test object.

In an embodiment of the present disclosure the NDT transducer comprises an ultrasonic NDT transducer configured to perform ultrasonic testing (UT). UT is a commonly used non-destructive testing method based on the propagation of ultrasonic waves in the object or material tested. A typical application consists of measuring the thickness of a test object. Other applications involve the detection of inhomogeneities of density or elasticity in materials such as a cavity or material flaw. UT is used in many industries including steel and aluminum construction, metallurgy, manufacturing, aerospace, automotive and other transportation sectors.

Alternatively, the NDT measurement corresponds to a measurement technique other than ultrasonic measurement.

In an embodiment of the present disclosure the positioning device comprises a hybrid motion/force control system configured to simultaneously control the position and/or orientation of the end effector together with the contact forces and/or contact moments.

Alternatively, the positioning device may comprise an impedance controller or an admittance controller configured to control the position and/or orientation of the end effector together with the contact forces and/or contact moments.

In an embodiment of the present disclosure the end effector is provided with a transducer holder configured to hold the NDT transducer, the transducer holder being configured to make contact with the surface of the test object, wherein the positioning device is configured to, based on the actuation signal, control the position and/or orientation of the NDT transducer relative to the test object together with contact forces and/or contact moments between the transducer holder and the test object.

It is an aim of the present disclosure to provide a method for non-destructive testing (NDT) of a test object solving one or more of the disadvantages in the state of the art.

This aim is achieved according to the disclosure with a method for NDT of a test object using a robot system as described above. The method comprises the steps of: loading at least a part of the predefined trajectory; moving, by the positioning device, the NDT transducer along a part of the surface of the test object; generating, by the NDT transducer, an NDT measurement of the part of the surface of the test object; processing, by the controller, the NDT measurement; generating, by the controller, the NDT feedback signal; generating, by the force-sensing device, a measurement of the contact forces and/or contact moments between the part of the surface of the test object and at least one of the NDT transducer and the transducer holder; processing, by the controller, the force measurement; generating, by the controller, the force feedback signal; and controlling, by the positioning device, the position and/or orientation of the NDT transducer relative to the test object together with contact forces and/or contact moments between the test object and the NDT transducer based on the predefined trajectory, the predefined trajectory, the NDT feedback signal and the force feedback signal.

This method has the same advantages as the robot system described above and, in particular, provides a high-quality NDT measurement in the presence of: deviations between the CAD model or point cloud model which was used to generate the predefined trajectory and the actual test object geometry; misalignment between the modelled position and/or orientation of the test object and its actual position and/or orientation; deviations between the predefined trajectory of the end effector and the real, executed trajectory; and/or local surface irregularities of the test object in terms of geometry or roughness. Moreover, this high-quality NDT measurement may be obtained without the need of a squirter or immersion of the test object in water.

In an embodiment of the present disclosure the NDT feedback signal and/or the force feedback signal are continuously generated. In other words, the position and/or orientation of the NDT transducer may be continuously adapted based on the NDT measurement and/or measured contact forces and/or contact moments.

In this embodiment, surface following and position/orientation adaptation based on the one or more NDT feedback signals from the NDT module and/or the force-sensing module are carried out simultaneously, resulting in a continuous adaptation of the position and/or orientation of the NDT transducer during the surface following according to the predefined trajectory.

To aid in disambiguating the direction in which the orientation has to be corrected, for example in some cases where there is insufficient information present in the one or more NDT feedback signals, an additional signal, commonly referred to as an active sensing signal, may be superimposed to the predefined trajectory. The correct direction in which to adapt the orientation of the NDT transducer can then be found from the correlation between the active sensing signal and the one or more NDT feedback signals from the NDT module.

In an alternative embodiment of the present disclosure surface following and position/orientation adaptation based on the one or more NDT feedback signals from the NDT module and/or the force-sensing module are carried out intermittently. In other words, the position and/or orientation of the NDT transducer are adapted in a discontinuous fashion. In such case, the controller typically alternates between a surface following mode and an adaptation mode. Hence, the robot system continues to move the NDT transducer relative to the test object surface with translation and rotation velocities corresponding to the predefined trajectory and/or the force feedback signal until the quality of the NDT measurement, for example as indicated by a quality measure calculated based on the one or more NDT feedback signals from the NDT module, switches the robot system from the surface following mode to the adaptation mode. In the adaptation mode, the robot system seeks an acceptable, improved or optimal position and/or orientation of the NDT transducer relative to the surface (e.g. a parallel alignment of the contact surface of the NDT sensor with the surface of the work piece) by changing the position and/or orientation of the NDT transducer in one or more directions, consecutively or simultaneously, while monitoring the NDT quality measure. Once an acceptable, improved or optimal position and/or orientation has been found, the controller switches again to the surface following mode and the NDT transducer resumes its trajectory relative to the surface with translation and rotation velocities corresponding to the predefined trajectory, but now with an adapted position and/or orientation in one or more directions.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
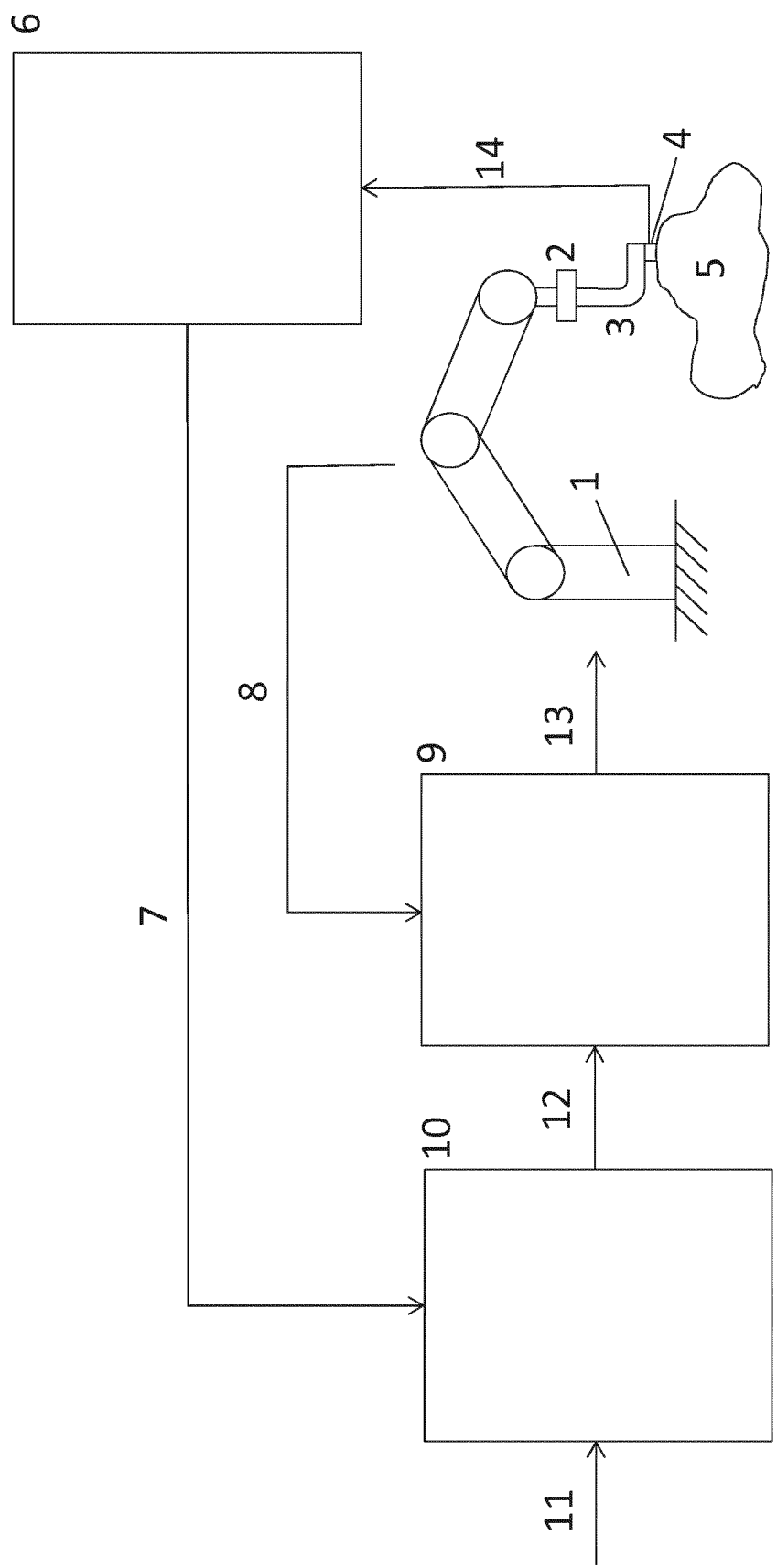
FIG. 1 illustrates a hardware set-up and algorithmic flow chart diagram according to an embodiment of the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

As used herein, the term "module" refers to a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon.

As used herein, a processor-readable medium is any medium that stores instructions, codes, data, or other information non-transitorily and is directly or indirectly accessible to a processor. In other words, a processor-readable medium is a non-transitory memory at which a processor can access instructions, codes, data, or other information. As a non-limiting example, a memory may be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof. In other words, memory can represent multiple processor-readable media. In some embodiments, memory can be integrated with processor, separate from processor, or external to computing system.

FIG. 1 illustrates a hardware set-up and algorithmic flow chart diagram according to an embodiment of the present disclosure. In this embodiment: the robot system comprises a robot arm 1 with end effector 2; an NDT transducer 4 which is in contact with the surface of a test object 5 and which is mounted on the robot end effector 2 by means of a transducer holder 3; an NDT measurement signal 14 which is provided by the NDT transducer 4; an NDT module 6 which receives the NDT measurement signal 14 as input and generates an NDT feedback signal 7 based on this input; a method 10 which receives the predefined robot trajectory 11 and the NDT feedback signal 7 as inputs and generates an adapted robot trajectory 12 based on both inputs, i.e. 12 is a robot trajectory in which the position and/or orientation of the end effector may or may not be modified with respect to the predefined trajectory 11; a force-sensing capability which provides measurements 8 of the contact forces and/or contact moments between the NDT transducer and the test object; a hybrid position/force controller 9 which receives the adapted robot trajectory 12 and the force/moment measurements 8, i.e. the force feedback signal, as inputs and generates the actuation signals 13 for the robot based on both inputs.

Figure 2:
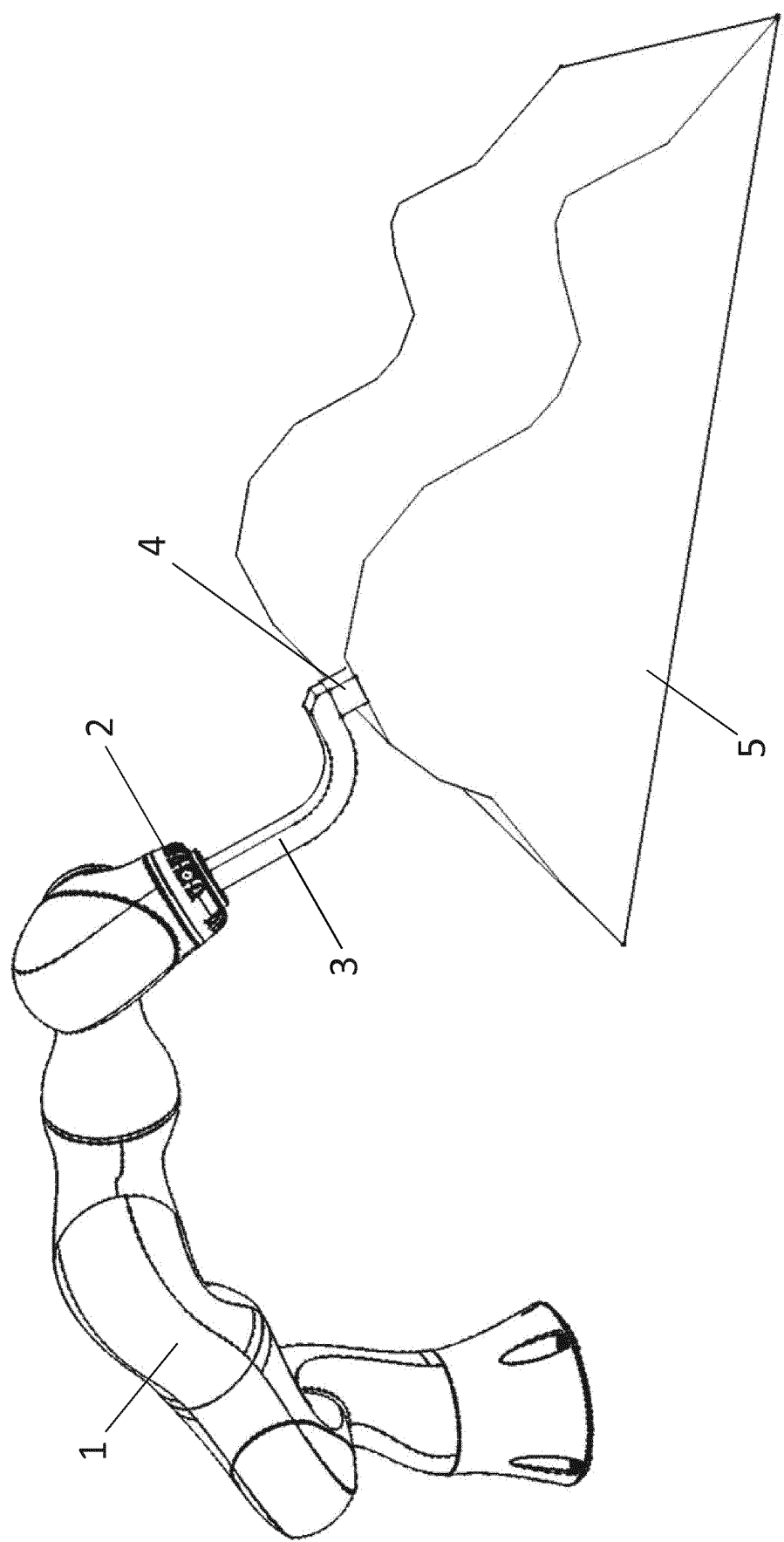
FIG. 2 shows an image of a robot system at a certain moment in time while following the surface of a test object with an NDT transducer.

FIG. 2 shows an image of a robot system at a certain moment in time while following the surface of a test object with an NDT transducer. In particular, FIG. 2 shows: a robot arm 1 with end effector 2; an NDT transducer 4 which is in contact with the surface of a test object 5 and which is mounted on the robot end effector 2 by means of a transducer holder 3.

Although aspects of the present disclosure have been described with respect to specific embodiments, it will be readily appreciated that these aspects may be implemented in other forms The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A robot system for non-destructive testing (NDT) of a test object, the robot system comprising:
   an end effector with an NDT transducer configured to perform an NDT on a surface of the test object, wherein the NDT transducer is configured to make contact with the surface of the test object;

a memory configured to store a predefined trajectory of said NDT transducer along the surface of the test object;
a controller comprising:
an NDT module configured to process measurements of said NDT transducer to generate an NDT feedback signal; and
a signal generation module configured to generate an actuation signal based on said predefined trajectory and said NDT feedback signal; and
a controlled multi degree of freedom positioning device configured to, based on said actuation signal, control the position or orientation of the NDT transducer relative to the test object,
a force-sensing device configured to provide measurements of contact forces or contact moments between the surface of the test object and the NDT transducer;
wherein the controller further comprises:
a force-sensing module configured to process measurements of said force-sensing device to generate a force feedback signal
wherein the signal generation module is configured to generate the actuation signal based on said predefined trajectory, said NDT feedback signal and said force feedback signal; and
wherein the controlled multi degree of freedom positioning device is configured to control the position or orientation of the NDT transducer relative to the test object together with contact forces or contact moments between the test object and the NDT transducer.

2. The robot system according to claim 1, wherein the force-sensing device comprises at least one torque transducer mounted on or within the positioning device.

3. The robot system according to claim 1, wherein the force-sensing device comprises a force transducer mounted on or within the end effector.

4. The robot system according to claim 1, wherein the controller is further configured to modify said predefined trajectory based on the measurements of said force-sensing device, the memory being further configured to store the modified trajectory.

5. The robot system according to claim 1, wherein the controller is further configured to modify said predefined trajectory based on the NDT measurements, the memory being further configured to store the modified trajectory.

6. The robot system according to claim 1, wherein said controller further comprises a trajectory generation module configured to generate at least a part of said predefined trajectory by using an automatic surface tracking algorithm or an automatic edge tracking algorithm based on the measurements of said force-sensing device.

7. The robot system according to claim 6, wherein said trajectory generation module is further configured to determine the local shape of the test object based on the measurements of said force-sensing device, the controller being further configured to determine the position of the NDT sensor relative to the test object by comparing the measured local shape of the test object with the local shape represented in the predefined trajectory.

8. The robot system according to claim 1, wherein said predefined trajectory is based on a geometric model of the test object, in particular a CAD model or a point cloud model.

9. The robot system according to claim 1, wherein said NDT transducer comprises an ultrasonic NDT transducer or a phased-array of ultrasonic transducers configured to perform an ultrasonic measurement.

10. The robot system according to claim 1, wherein the positioning device comprises a hybrid motion/force controller configured to perform simultaneous control of the position or orientation of the end effector and of the contact forces.

11. The robot system according to claim 1, wherein the positioning device comprises an impedance controller or an admittance controller configured to perform simultaneous control of the position and/or orientation of the end effector and of the contact forces.

12. The robot system according to claim 1, wherein the end effector is provided with a transducer holder configured to hold the NDT transducer, the transducer holder being configured to make contact with the surface of the test object, wherein the force-sensing device is further configured to provide measurements of the contact forces or contact moments between the surface of the test object and the transducer holder and wherein the positioning device is configured to, based on said actuation signal, control the position or orientation of the NDT transducer relative to the test object together with contact forces or contact moments between the transducer holder and the test object.

13. The robot system according to claim 1, wherein the positioning device is a robot arm.

14. A method for non-destructive testing, NDT, of a test object using a robot system according to claim 1, the method comprising:
loading at least a part of said predefined trajectory;
moving, by the positioning device, the NDT transducer along a part of the surface of the test object;
generating, by the NDT transducer, an NDT measurement of said part of the surface of the test object;
processing, by the controller, said NDT measurement;
generating, by the controller, said NDT feedback signal; and
controlling, by the positioning device, the position or orientation of the NDT transducer relative to the test object based on the predefined trajectory and the NDT feedback signal,
generating, by the force-sensing device, a measurement of contact forces or contact moments between said part of the surface of the test object and the NDT transducer;
processing, by the controller, said force measurement; and
generating, by the controller, said force feedback signal and,
wherein controlling, by the positioning device, the position or orientation of the NDT transducer relative to the test object based on the predefined trajectory and the NDT feedback signal comprises: controlling, by the positioning device, the position or orientation of the NDT transducer relative to the test object together with contact forces or contact moments between the test object the NDT transducer based on the predefined trajectory and the NDT feedback signal and the force feedback signal.

15. The method according to claim 14, wherein said NDT feedback signal or said force feedback signal are continuously used to adapt the position or orientation of the NDT transducer relative to the test object while controlling the contact forces or contact moments between the test object and the NDT transducer.

16. The method according to claim 14, wherein the control system intermittently changes between a surface following mode in which the test object is inspected and which uses said force feedback signal or said predefined trajectory, and an adaptation mode in which the position or orientation of the NDT transducer relative to the test object together with contact forces or contact moments between the test object and the NDT transducer are adapted based on said NDT feedback signal or said force feedback signal.

17. The method according to claim 14, wherein the method further comprises:
- modifying, by the controller, said predefined trajectory based on said NDT feedback signal or said force feedback signal; and
- storing, by the controller, the modified trajectory in the memory.

18. The method according to claim 14, the method further comprising:
- generating, by the controller, at least a part of said predefined trajectory by using an automatic surface tracking algorithm or an automatic edge tracking algorithm based on the measurements of said force-sensing device.

19. The method according to claim 14, the method further comprising:
- generating, by the force-sensing device, a measurement of the contact forces or contact moments between said part of the surface of the test object and the transducer holder; and
- controlling, by the positioning device, the position or orientation of the NDT transducer relative to the test object together with contact forces or contact moments between the test object, the NDT transducer and the transducer holder based on the predefined trajectory, the predefined trajectory, the NDT feedback signal and the force feedback signal.

* * * * *